June 24, 1958 R. R. DENMAN 2,839,870
MACHINE FOR PRESS MOLDING GLASS ARTICLES
Filed Jan. 10, 1956 5 Sheets-Sheet 1

INVENTOR.
Robert R. Denman
BY
ATTORNEYS

INVENTOR.
Robert R. Denman

INVENTOR.
Robert R. Denman

United States Patent Office 2,839,870
Patented June 24, 1958

2,839,870

MACHINE FOR PRESS MOLDING GLASS ARTICLES

Robert R. Denman, Sylvania, Ohio, assignor to Owens-Illinois Glass Company, a corporation of Ohio Application January 10, 1956, Serial No. 558,335

13 Claims. (Cl. 49—35)

The present invention relates to machines for press molding molten or plastic material for forming various articles and more particularly for molding hollow glass articles. The invention as herein illustrated and described is comprised in a machine having molding units mounted on a rotatable carriage and brought in succession to a press molding station. A press plunger carrying a molding element or head is mounted at the molding station for vertical reciprocation for press molding the articles. The machine is adapted for molding hollow articles comprising a bottom or body portion and a cylindrical or other shaped rim portion extending upwardly from the bottom portion of the article. In the specific embodiment of the invention as herein illustrated the machine is designed for molding face plates of television picture tubes.

Each molding unit or assembly on the mold carriage comprises a body mold for molding the bottom surface of the face plate and a ring mold seated thereon for molding the exterior surface of the rim or flange portion of the face plate. When the press plunger is moved downward to press mold a charge of molten glass the ring mold is accurately centered by the downwardly moving plunger head.

In prior art machines of this general type the so-called spring plate is mounted for up-and-down movement with the press plunger and as the latter moves downward the plate seats on the ring mold and is thereby arrested before the plunger completes its downward movement. The pressure by which the plunger is being lowered is transmitted through springs to the pressure plate so that the ring mold is held down by the full pressure of the plunger during its continued downward movement by which the charge of glass is press molded. The heavy downward pressure on the molding ring during the descent of the plunger prevents free movement for lateral adjustment.

An object of the present invention is to provide a construction and means for overcoming this difficulty. For this purpose piston motors or cylinders are interposed between the molding ring and the press plunger and serve as a means for applying a regulated downward pressure to the molding ring while the descending press plunger is centering the ring. Such pressure on the ring is made comparatively light to allow it to be moved freely to its centered position in register with the body mold thereunder.

The pressure applied by these cylinders is then increased before the molding operation is completed so that the ring mold is securely held in its centered position during the continued downward movement of the press plunger for molding the glass.

A further object of the invention is to provide improved means operative during the unlocking of the press links to prevent the usual vibration due to the jarring action accompanying a sudden release of the press load. For this purpose the invention provides means for again increasing the pressure applied to the molding ring by the hydraulic piston motors.

A further object of the invention is to provide improved means for controlling the speed of the press plunger during its downward movement. For this purpose the exhaust flow from the cylinders which hold the molding ring may be metered or throttled to reduce and control the speed of the plunger.

Other objects of the invention will appear more fully hereinafter.

Referring to the accompanying drawings which illustrate a press molding machine to which my invention is applied:

Figure 1:
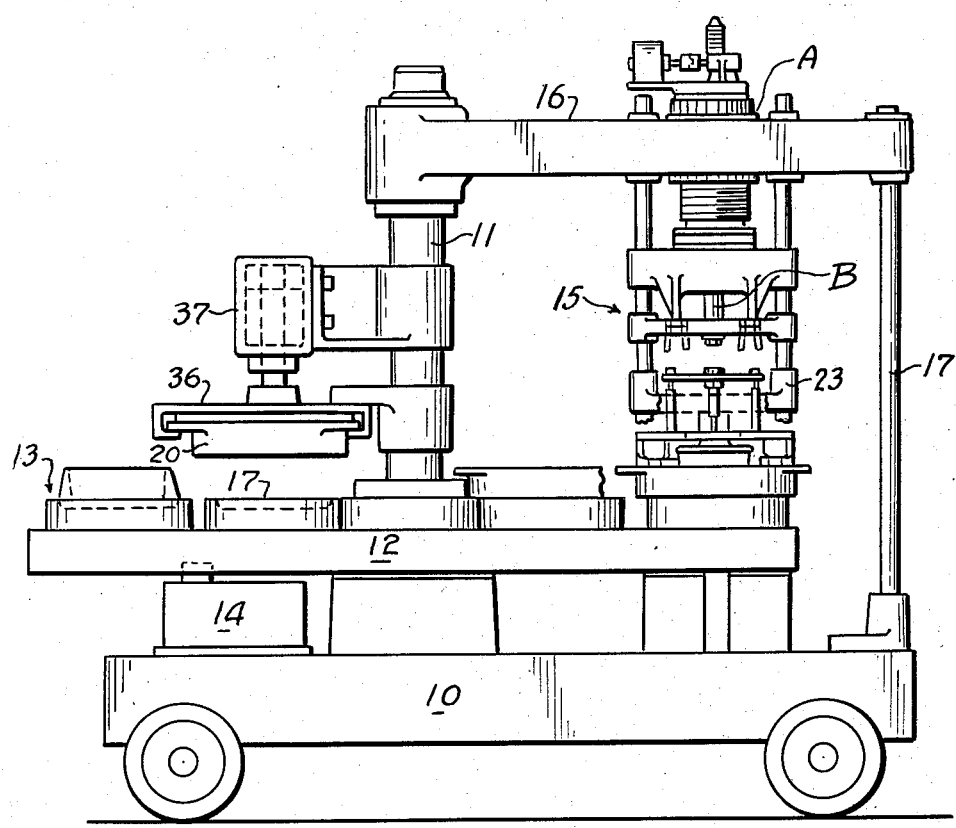
Fig. 1 is an elevational view of the machine.

Referring to Fig. 1, the operating parts are mounted on a machine base 10 carrying a vertical column 11. A mold carriage 12 is mounted for rotation about the axis of the column 11. Molding units or assemblies 13 are mounted on the carriage 12 and uniformly spaced circumferentially of the carriage. The carriage is rotated intermittently step-by-step by a carriage driving means 14 for bringing the mold units 13 in succession to a press molding station. The press plunger mechanism 15 is supported by a horizontal frame member 16 attached to the column 11 and to supporting rods 17.

Figure 2:
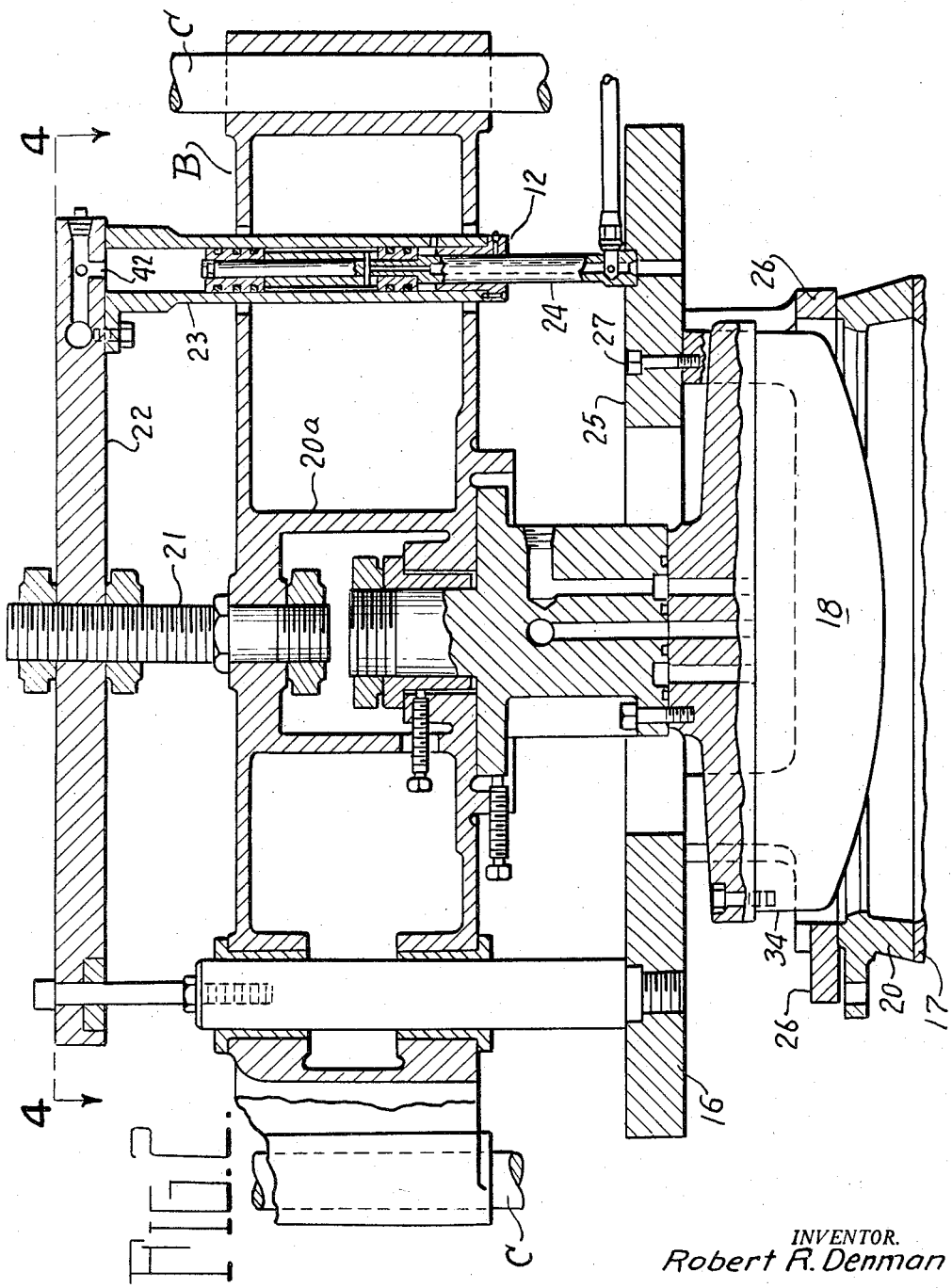
Fig. 2 is a part sectional elevation of the press molding head and associated parts.
Figure 5:
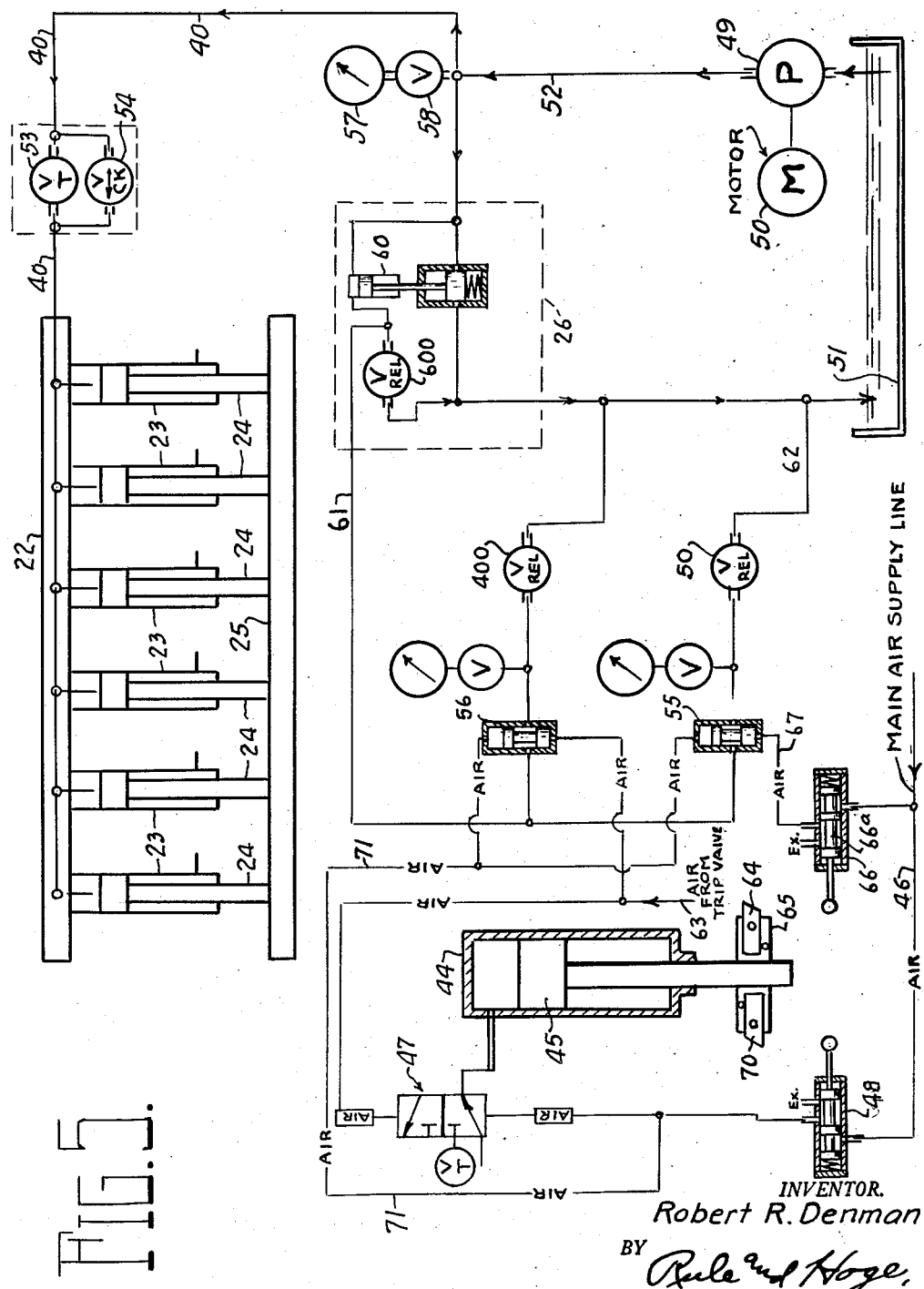
Fig. 5 is a diagram of the hydraulic and air operated parts and their control system.

The press plunger is movable up and down by a piston motor comprising a cylinder 44 and piston 45 (Fig. 5). A plunger head 18 functions as a mold or press molding head for press molding charges of molten glass within the mold units or assemblies 13. Each of these units comprises a bottom mold 17 for molding the face of the face plate, and a molding ring 20 for molding the outer rim surface. The plunger head 18 is connected to a frame 20ª (Fig. 2) carried by and adjustable up and down on the plunger shaft 21. A carrier plate 22, also adjustably mounted on the shaft 21, carries a plurality of cylinders 23 which are uniformly spaced circumferentially of the plunger, the machine as shown comprising six such cylinders. Piston rods 24 which work in the cylinders 23, are attached at their lower ends to a plate 25, generally known as a spring plate. A pressure ring 26 is mounted beneath and attached to the plate 25 by bolts 27. The cylinders 23 serve as carriers for the plate 25 and ring 26 for lifting and lowering them with the plunger and for applying a regulated downward pressure on the molding ring 20 during the press molding operation, as more fully set forth hereinafter. The cylinders 23 with their pistons serve as hydraulic pressure devices interposed between the press molding head 18 and the ring mold 20 for applying hydraulic pressure to the ring mold. This pressure is independent of the pressure by which the molding head is lowered. A hydraulic fluid circulating system including a pump 49 driven by a motor 50 (Fig. 5), supplies fluid under pressure to the said hydraulic pressure devices 23, 24. The degree of this pressure is controlled by pressure relief valves in the hydraulic system, said valves being operable at various pressures to supply corresponding pressures to the hydraulic pressure devices 23, 24.

The molding ring 20 is formed with a vertically disposed molding surface 30 which registers with the molding surface of the bottom mold 17 and molds the outer surface of the rim 31 of the face plate 32. The ring is formed with a shoulder 33 which molds the top marginal surface of the flange 31. The molding head 18 is formed with a vertically disposed surface 34 for molding the inner surface of the rim 31. As the plunger descends the surface 34 engages the shoulder portion of the ring 20 and thereby accurately centers the ring and holds it centered during the final molding of the glass. The pressure of the ring 26 on the molding ring 20 is comparatively light immediately following the seating of the ring 26 on the molding ring, to thereby permit any required lateral movement of the ring 20 for bringing it into register with the body mold 17 as it is centered by the descending head 18. This pressure is increased during the final downward movement of the plunger, thereby securely holding the ring in its centered position while the head 18 is under a high molding pressure. The pressure is then further increased while the plunger is withdrawn upwardly. The means for controlling these pressures will be described presently.

After a molding operation the carriage 12 is indexed to bring the next succeeding mold unit 13 to the pressing station. This movement also brings a mold unit with a molded article therein to a take-out station (Fig. 1). At this station a lifting device 36 engages the molding ring or shell 20. A motor 37 then operates to lift the shell 20 permitting the molded article to be removed from the mold 17.

Figure 3:
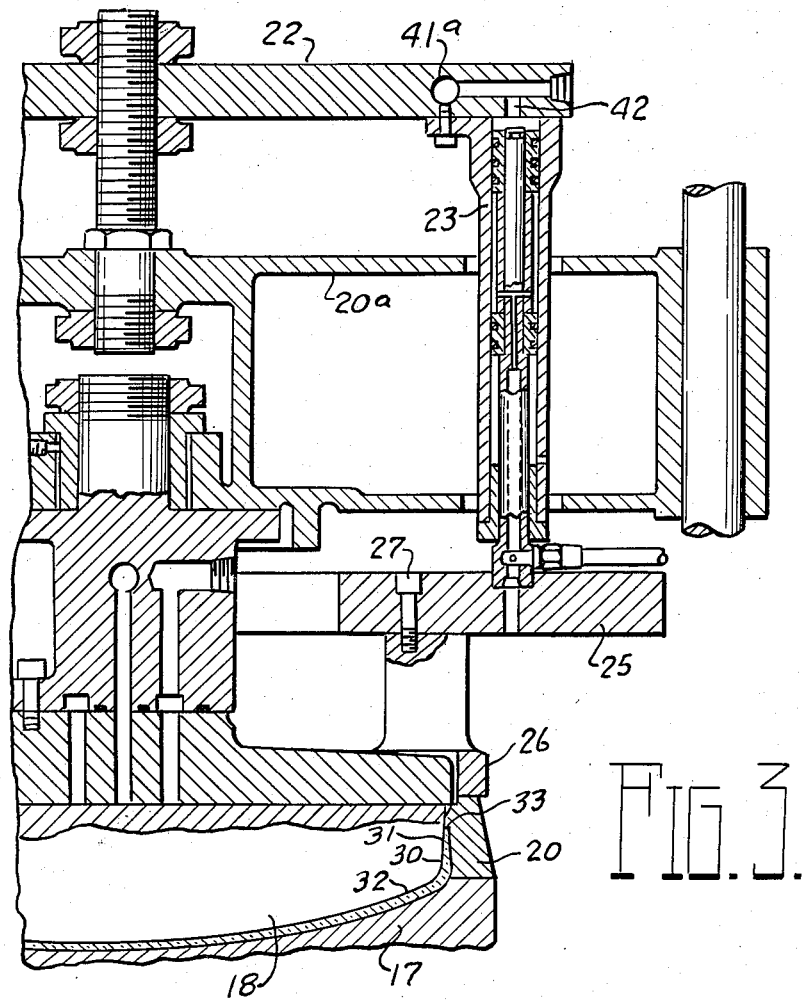
Fig. 3 is a view similar to Fig. 2 but with parts broken away and with the press plunger shown in its fully lowered position.
Figure 4:
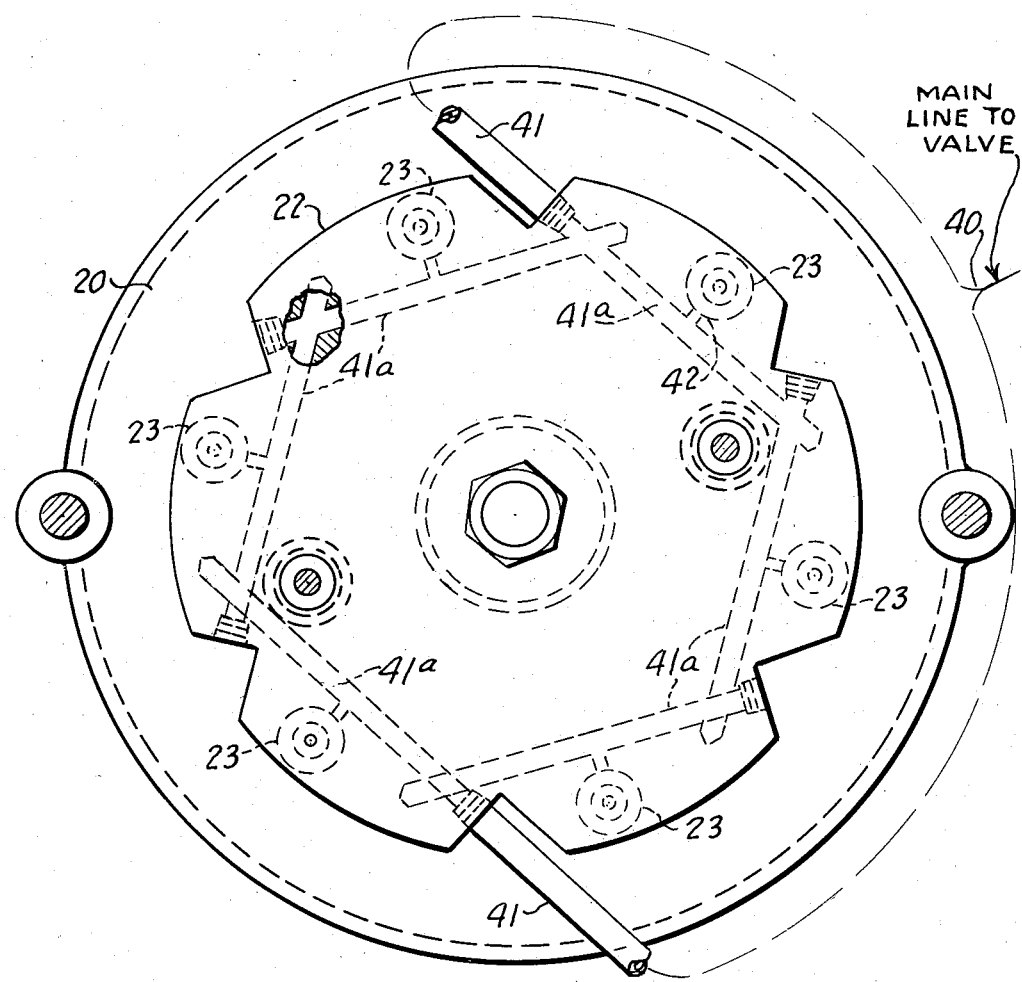
Fig. 4 is a sectional plan view at the line 4—4 on Fig. 2.

The hydraulic cylinders 23 are supplied with fluid, preferably oil, through a main pipe line 40 (Fig. 4) and branch lines including pipes 41 and bores 41ª in the plate 22, through which the fluid is conveyed to ports 42 (Figs. 3 and 4) which open into the upper ends of the cylinders 23.

The hydraulic and pneumatic control systems will be understood by reference to the diagram (Fig. 5) which will now be described. The press plunger is operated by the air motor comprising a cylinder 44 and piston 45. Air for operating this motor is in a circuit separate and independent of the illustrated hydraulic circuit, Fig. 5, and is under the control of the timer commonly used with this type of machine.

Hydraulic pressure is supplied to the cylinders 23 by a pump 49 driven continuously by a motor 50 and drawing hydraulic fluid (oil) from the tank 51. The oil is transmitted through the pressure line 52, 40 to the cylinders 23. A throttle valve 53 in the line 40 serves as a meter valve by which the rate of flow of the exhaust fluid from the cylinders 23 is adjustably regulated and controlled for controlling the speed at which the press plunger is lowered, as hereinafter described. A check valve 54 which bypasses the valve 53 permits a free flow back to the cylinders 23 during their extension as the press plunger moves upwardly.

The hydraulic pressure applied to the cylinders 23 is controlled by three pressure relief valves 50, 400, and 600. These valves may operate, for example, at 50, 400, and 600 p. s. i. respectively, although such pressures may be varied. Shut-off valves 55 and 56 control the supply of fluid through the relief valves 50 and 400 respectively. A pressure gauge 57 indicates the pressure in the pump line 52. The gauge may be shut off by a hand valve 58.

While the press plunger is in its lifted position the cylinders 23 with their piston rods 24 are fully extended. When the press plunger is ready to commence its descent the shut-off valves 55 and 56 are open through the pressure relief valves 50 and 400 to the drain. The pump 49 is unloading through the relief valve 50 at its operating pressure (50 p. s. i.). The circuit includes the line 52 extending from the pump to a piston valve 60, pipe line 61, shut-off valve 55, and relief valve 50, the latter opening through a line 62 to the drain tank 51.

When the press plunger starts downward, the plates 25 and 22, with the extended cylinders 23, move downward as a unit with the piston until the ring 26 seats on the molding ring 20, thus arresting the plate 25 when the plunger reaches an intermediate position, for example, three inches or less from its lowermost or mold closing position.

When the plate 25 is thus arrested it provides a speed control means for regulating and controlling the speed of the plunger. This speed control is effected by the meter valve 53 throttling the flow of the exhaust fluid from the cylinders 23 while the carrier plate 22 continues its downward movement with the press plunger. The press plunger head 18 during this continued downward movement engages and centers the molding ring 20.

A cam 64 mounted on the toggle ram 65, which moves downward with the press plunger, operates a pilot valve 66 as the plunger nears its lowered position, for example, ¼ inch from the final closing position. The valve piston 66ª is moved to the right by the cam so that the valve 66 is opened and supplies air pressure from the main air supply line through a line 67 to the shut-off valve 55. The valve 55 is thereby operated and closes the hydraulic line to the relief valve 50. This causes the pressure in the hydraulic system to be built up immediately to the pressure required for operating the relief valve 400. This increased pressure applied through the line 40 to the cylinders 23 correspondingly increases the hold down pressure applied by the plate 25 to the molding ring, thus securely holding it during the press molding of the gob of glass to the finished shape of the molded article.

The pressing period ends when the machine timer opens a pilot valve supplying air pressure through the line 63 for shifting and closing the shut-off valve 56, thus blocking the flow through the pressure relief valve 400. This transfers the pressure control to the relief valve 600 so that the pressure of the plate 25 and the ring 26 on the molding ring 20 is correspondingly increased. This pressure, reacting upwardly, provides sufficient force to permit the toggle ram and the plunger to rise smoothly away from the molded glass as the air pressure in the press plunger cylinder 44 is gradually released. The air pressure supply through the line 63 also shifts the main control valve 47 of the pressing cylinder 44, thereby permitting the upward movement of the plunger.

When the press molding head 18 has moved upwardly and is clear of the glass, for example, by about ⅛ inch, a pilot valve 48 mounted on the press frame is opened by a cam 70 mounted on the toggle frame. The valve 48 when opened allows air pressure from the line 46 through the valve 48 and line 71 of the shut-off valves 55 and 56 which block the pressure relief valves 50 and 400, thereby opening the circuits for the relief valves. The air pressure through the valve 48 also opens the exhaust line to the pressing cylinder 45 so that the plunger may be fully raised.

Modifications may be resorted to within the spirit and scope of my invention.

I claim:

1. In a press molding apparatus a mold assembly comprising molding sections positioned one in contact with the other and relatively movable for bringing their molding surfaces in register, a press molding element, means for moving said element toward and from the said mold assembly for molding an article, one of said molding sections being in position to be engaged by the press molding element while the latter is moving toward the mold assembly and to be moved thereby laterally into position to bring the said molding surfaces into register, means for holding said molding sections together with a predetermined pressure during that portion of the movement of the press molding element in which the molding surfaces are being brought into register, and means for automatically increasing said pressure after the molding surfaces are brought into register and the press molding element reaches a predetermined intermediate position during its said movement toward the mold assembly.

2. The combination set forth in claim 1, the means for applying said pressure comprising a hydraulic motor.

3. The combination of a mold assembly comprising a bottom mold, a ring mold mounted thereover and seated on the bottom mold, a press molding element mounted for up-and-down movement from and to a molding position for molding an article within the said mold assembly, said press molding element being shaped to enter and engage said ring mold while the latter is seated on the bottom mold and center the ring mold with respect to said bottom mold by horizontal movement of the ring mold during the downward movement of the said element and while the ring mold remains seated on the bottom mold, the ring mold and bottom mold having flat, horizontally disposed contacting surfaces permitting the said horizontal centering movement of the ring mold, means for applying a predetermined downward pressure on the ring mold during the centering thereof by the press molding element, and means for thereafter increasing said downward pressure during the final downward movement of the press molding element.

4. The combination set forth in claim 3, including means for further increasing the downward pressure and maintaining said further increased pressure until after the press molding element has commenced its upward movement.

5. Press molding apparatus comprising a mold assembly including a bottom mold and a ring mold seated thereon, said molds having molding surfaces adapted to be brought into register, a press molding head mounted over said mold assembly for up-and-down movement relative thereto, said press molding head being shaped to enter the ring mold as the head moves downward and while the ring mold is seated on the bottom mold and hold the ring mold centered in register with the said bottom mold, a pressure element positioned over the ring mold, and means for applying downward pressure to said pressure element during a portion of the downward movement of the press molding head in which the molding ring is centered, and automatic means for increasing the said pressure after the press molding head reaches centering position and during the final downward movement of the said molding head.

6. A molding machine comprising a mold assembly including a bottom mold and a ring mold seated thereon, a press plunger mounted over the mold assembly and including a press molding head, means for moving the plunger up and down while the ring mold is seated on the bottom mold and causing said head to press mold a charge of molten glass within the said mold assembly and thereby form a molded article, a pressure ring positioned over the ring mold, means connecting the pressure ring with the press plunger for downward movement by which the pressure ring is seated on the ring mold when the press molding head reaches a predetermined position during its downward movement, means operable independently of the press plunger and pressure applied thereto for applying a predetermined downward pressure to the pressure ring during a further downward movement of the press molding head, and means for then increasing said downward pressure during the final downward movement of the press molding element.

7. A press molding machine comprising a bottom mold, a ring mold seated on the bottom mold, a press plunger including a molding head, means for moving the press plunger up and down, said molding head being shaped and positioned to enter the ring mold during the downward movement of the molding head and center the ring mold in register with the bottom mold while the ring mold is seated on the bottom mold, the ring mold being shiftable laterally while seated on the bottom mold for said centering, a pressure plate a pressure ring connected to said plate, a hydraulic motor interposed between said pressure plate and the press plunger providing means for lowering the pressure plate during a portion of the downward movement of the said molding head and thereby lowering and seating said pressure ring on the molding ring when the molding head reaches an intermediate position, said hydraulic motor being operable to apply a predetermined pressure to the ring mold during the centering thereof by the said molding head, and means for automatically increasing the hydraulic pressure during a further downward movement of the molding head after the ring mold is centered.

8. A press molding machine comprising a mold assembly including a bottom mold and a ring mold seated thereon and shiftable laterally for bringing it into register with the bottom mold, a press plunger mounted over said mold assembly, means for moving the plunger up and down while the ring mold is seated on the bottom mold, a press molding head connected to the plunger and movable downward to the said mold assembly for press molding articles therein, said molding head being shaped to engage the ring mold while the latter is seated on the bottom mold and register it with the bottom mold as the molding head moves downward, hydraulic pressure devices each comprising a vertical cylinder and a piston movable up and down therein, a carrier plate connected to the press plunger for up-and-down movement therewith, the said cylinders being connected to and depending from said carrier plate, a pressure plate to which the said pistons are connected, a pressure ring carried by said plate and positioned over the molding ring mold, said pressure ring being spaced above the ring mold when the molding head is in its upper position, said pressure plate being movable downwardly with the molding head to seat the pressure ring on the ring mold when the molding head reaches an intermediate position, means for applying a predetermined hydraulic pressure to the pistons when said pressure ring is seated on the ring mold and during the centering of the ring mold by the said molding head, and automatic means for increasing said pressure during the final downward movement of the press molding head.

9. The combination set forth in claim 8 including means for further increasing the hydraulic pressure in the hydraulic pressure devices and the downward pressure thereof on the ring mold while the molding head is in its lowermost position and during the initial upward movement of the said head after the molding operation.

10. The combination set forth in claim 8, the hydraulic pressure devices being positioned at uniformly spaced intervals around the axis of the press plunger.

11. The combination set forth in claim 8 including means for metering and throttling the flow of fluid exhausted from the hydraulic cylinders during the downward movement of the press plunger and thereby controlling the speed of said downward movement during the press molding.

12. A machine for press molding glass articles comprising a mold assembly including a bottom mold, a ring mold seated thereon, the engaging surfaces of the said molds being horizontally disposed and the ring mold thereby shiftable laterally while seated on the bottom mold for bringing molding surfaces of said molds into register, a press plunger mounted over the mold assembly, a press molding head connected to the plunger and spaced above the mold assembly, a piston motor for moving the plunger and molding head downward, a pressure ring positioned over the ring mold, means providing operating connections between the pressure ring and the press plunger including hydraulic pressure devices, a carrier plate for said devices connected to the plunger, each of said hydraulic pressure devices including a cylinder connected to the carrier plate and depending therefrom and a piston rod having operating connection with the said pressure ring and holding said pressure ring spaced above the ring mold while the press plunger is in its upper position, said pressure ring being brought down on to the ring mold during the downward movement of the molding head and thereby arrested, means for transmitting an operating fluid to the hydraulic cylinders under a predetermined pressure when the pressure ring is seated on the ring mold and during a continued downward movement of the molding head, and means for thereafter increasing the said hydraulic pressure and maintaining said increased pressure during the final portion of the downward movement of the molding head.

13. The apparatus defined in claim 12, the means for maintaining and increasing the hydraulic pressure comprising pressure relief valves in circuits for the operating fluid.

References Cited in the file of this patent

UNITED STATES PATENTS

| | | |
|---|---|---|
| 618,560 | Coleman et al. | Jan. 31, 1899 |
| 1,027,567 | Schies | May 28, 1912 |
| 1,455,643 | Manning | May 15, 1923 |
| 1,931,375 | Cook et al. | Oct. 17, 1933 |
| 2,011,980 | Miller | Aug. 20, 1935 |
| 2,146,346 | Nelson | Feb. 7, 1939 |
| 2,423,914 | Wacker | July 15, 1947 |

FOREIGN PATENTS

| | | |
|---|---|---|
| 984,110 | France | July 2, 1951 |